Dec. 22, 1959   K. KARNATH ET AL   2,918,311
TRAILER COUPLING WITH STATIONARY COUPLING HOOK
Filed March 25, 1957                     5 Sheets-Sheet 3

INVENTORS
K. Karnath, K.-J. Karnath
& G. Karnath
By Lowry & Rinehart
ATTYS.

Dec. 22, 1959  K. KARNATH ET AL  2,918,311
TRAILER COUPLING WITH STATIONARY COUPLING HOOK
Filed March 25, 1957  5 Sheets-Sheet 5

INVENTORS
Kurt Karnath, Klaus-J. Karnath
& Günther Karnath
By Lowry & Rinehart
ATTYS.

United States Patent Office 2,918,311
Patented Dec. 22, 1959

2,918,311

TRAILER COUPLING WITH STATIONARY COUPLING HOOK

Kurt Karnath and Klaus-Jürgen Karnath, Wiesbaden, and Günther Karnath, Unna, Westphalia, Germany; said Kurt Karnath and said Günther Karnath assignors to said Klaus-Jürgen Karnath Application March 25, 1957, Serial No. 648,360

Claims priority, application Germany March 26, 1956

11 Claims. (Cl. 280—510)

The invention relates to trailer couplings, and more specifically to a trailer coupling with a stationary coupling hook and a movable mouth-closing piece.

Trailer couplings with stationary coupling hooks are already known. In these couplings the closing of the mouth is effected by a hingedly mounted closing piece which is secured in its locking position by a bolt and by springs.

Segment-shaped closing pieces for such couplings have also been suggested, which are forced into closed position by spring pressure. However, this construction being arranged above the coupling hook is of unfavorable height and thus subjected to fouling and icing.

It is the object of the present invention to eliminate said disadvantages and to provide a trailer coupling which can be automatically engaged and in two of three forms of construction hereinafter described in detail, can also be disengaged both when the vehicles are stationary and also when they are travelling.

According to the invention the trailer coupling comprises a stationary coupling part including a tow hook and a shank portion, a mouth-closing piece movable parallel to the longitudinal axis of the stationary coupling part, a coupling sleeve slidable on the shank portion and formed integral with the mouth-closing piece, means secured to the trailer coupling for guiding a towing eye of a trailer into engagement with the tow hook of the stationary coupling part, and a cutout in said guide means through which said mouth-closing piece projects.

The guide means for the towing eye of the trailer may consist of a stationary dish-like sheet metal guide piece with lateral guide walls or of a funnel-shaped sheet metal guide piece composed of a stationary guide part and a movable guide part, in which latter case, during the operation of the coupling, the movable guide part carries out a swing movement in upward or downward direction to expose the stationary tow hook.

For automatically engaging the towing eye of the trailer at different angles of engagement, it has been known heretofore to use closed guide funnels. However, such guide funnels could heretofore only be employed for trailer couplings with movable tow hooks but not for those with stationary tow hooks.

By a lever arrangement cooperating with a projection on the coupling sleeve, the trailer coupling can be disengaged both by hand when the vehicles are stationary and also by remote operation from the driver's seat by means of a pull-rope or the like while the vehicles are travelling or stationary.

Three preferred embodiments of the trailer coupling according to the invention are illustrated diagrammatically by way of example in the accompanying drawings, in which:

Fig. 1A is a fragmentary vertical longitudinal sectional view on Fig. 1, showing the coupling sleeve and mouth closing piece carried thereby;

Fig. 1B is an end elevational view of the forked lever for operating the coupling sleeve;

Similar reference numerals refer to similar parts throughout the several figures.

Figure 1:
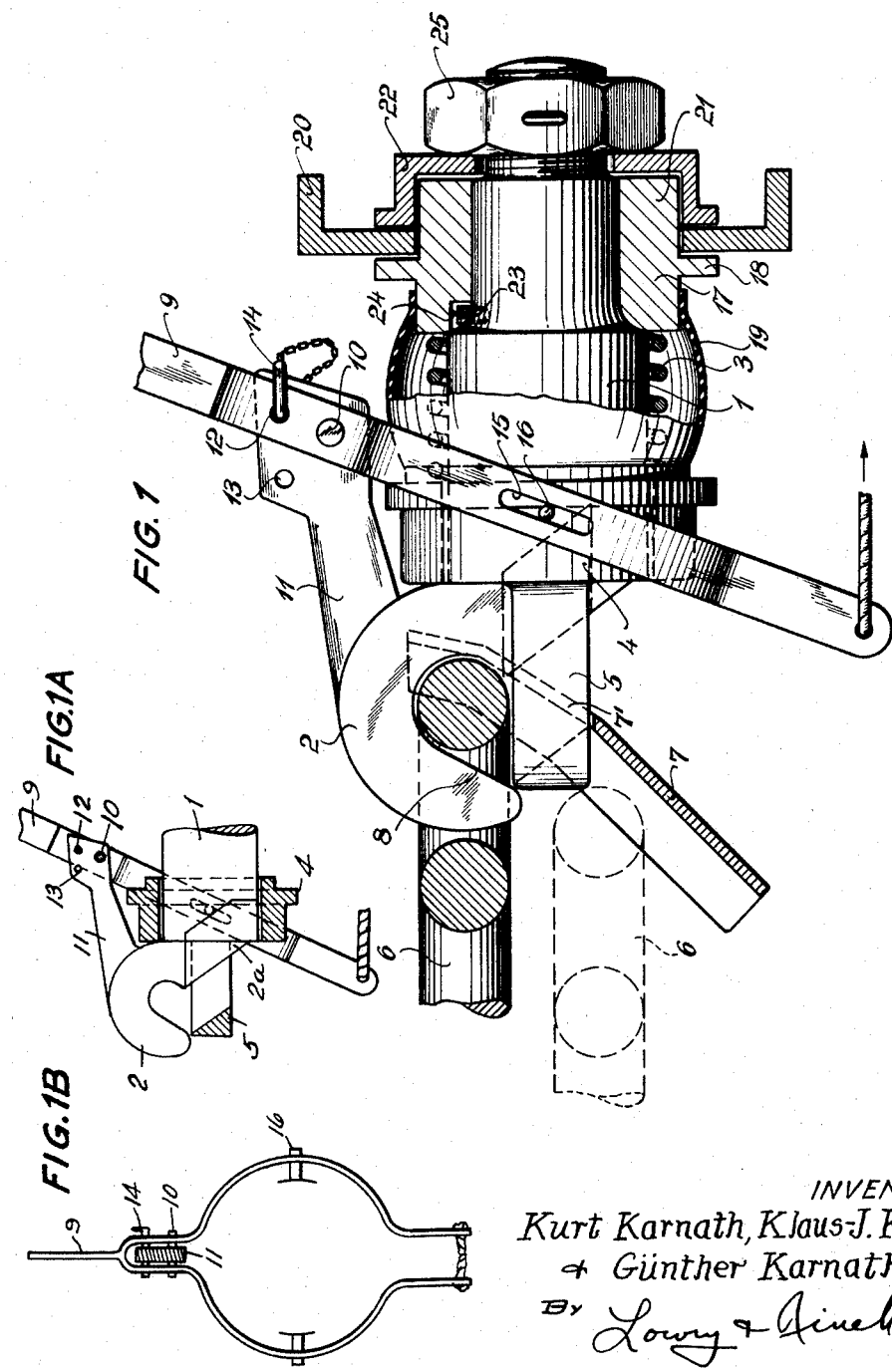
Fig. 1 shows a first form of construction, partly in side elevation and partly in section, with a dish-like sheet metal guide piece.

Referring now to the drawings, Fig. 1 shows a trailer coupling of a towing vehicle which comprises a rigid or stationary coupling part which forms at its rear end a tow hook 2 and at its front end a cylindrical shank portion 1. A coupling sleeve 4 loaded by a pressure spring 3 is arranged about the shank portion 1 of the stationary coupling part and formed integral with a mouth-closing piece 5. The mouth-closing piece 5 has a cutout through which the tow hook 2, which has a downwardly sloping flattened neck 2a, extends and terminates in the shank portion 1. In this manner a central pressure on the coupling sleeve 4 is ensured during the coupling operation. The pressure spring 3 acting on the coupling sleeve tends to keep the coupling mouth always closed.

In the construction illustrated in Fig. 1, a dish-like sheet metal guide piece 7 having a cutout 7' through which the mouth-closing piece 5 extends serves for guiding the towing eye 6 of a trailer onto the mouth-closing piece 5 when the trailer is being hitched on to the towing vehicle. The trailer thus pressing against the coupling, shifts the mouth-closing piece 5 forward and enables the towing eye 6 to slide onto the tow hook 2. At this moment the coupling sleeve 4 springs back under the action of the pressure spring 3 and its closing piece 5 closes the mouth of the coupling. When the towing eye 6 is being introduced the sloping shape of the sheet metal guide piece 7 guides this eye reliably into the coupling mouth and into engagement with the tow hook 2.

Owing to the slight play which the towing eye 6 has in the coupling mouth, the tow hook is only subjected to tractional stresses which results in a long life of the tow hook. In addition the thrust impacts occurring when travelling are weakened by the slight play.

To protect the inner surfaces of the coupling mouth against wear, they are preferably hardened. Moreover, the inner surface of the free end of the tow hook 2 has a suitably shaped slope 8 which ensures reliable disengagement of the towing eye 6 when the mouth is open.

According to Figs. 1 and 1A, unhitching of a trailer is effected by pressing back the coupling sleeve 4 by hand or with the aid of a forked lever 9. This forked lever 9 is pivotally connected to a bracket 11 formed on the stationary coupling part, at 10.

To lock the coupling sleeve 4 both in open and closed position, two bores 12 and 13 are provided in the bracket 11 and a corresponding bore in the forked lever 9, through which bores a bolt 14 can be selectively passed. If the bolt 14 is passed through the bore 12 in the bracket 11 and the bore in the lever 9, the coupling is locked in its closed position not only by the pressure exerted by the spring 3 but also by the locking action of the lever 9. The fork of the lever 9 has slots 15 in which pins 16 on the coupling sleeve 4 slidably engage.

The cylindrical shank portion 1 of the stationary coupling part rests in a bearing bush 17 on which a fixing flange 18 is formed. Between the fixing flange 18 and the coupling sleeve 4 the pressure spring 3 is arranged. A rubber sleeve 19 forms a protection against fouling and icing.

In the case of relatively small towing vehicles, such as jeeps or the like, in which axial turning of the coupling is not necessary, this fixing flange 18 forms an end part of the trailer coupling by means of which the coupling is bolted on to a conventional cross-member 20 provided on the towing vehicle. In the case of larger towing vehicles the bearing bush 17 is provided with an extension 21 surrounding the cylindrical shank portion 1 of the stationary coupling part as shown in Fig. 1. Furthermore, a second flange 22 and a pin 23 are provided. The pin 23 engages in a segment-shaped recess 24 in the bearing bush 17 and laterally limits axial rotation of the coupling. A nut 25 is screwed onto the front end of the shank portion 1 having a corresponding screw thread and may be secured by a splint provided thereon.

If it is desired to disengage the coupling from the driver's seat, the lever 9 is extended in downward direction so that the coupling may be opened from the driver's seat by moving the lever 9 in the direction of the arrow through the intermediary of a pull element.

The trailer coupling illustrated in Fig. 1 operates in the following manner:

Engagement

When the towing eye 6 of the trailer strikes against the sheet metal guide piece 7 of the towing vehicle, it slides thereon and forces the mouth-closing piece 5 with the coupling sleeve 4 in forward direction, thereby compressing the spring 3 until the tow hook 2 engages in the aperture of the towing eye 6. The spring 3 then presses back the coupling sleeve 4 with the mouth-closing piece 5 and closes the coupling mouth. When travelling, any vacillatory movements of the trailer are prevented in known manner by side walls formed on the sheet metal guide piece 7.

Disengagement

By actuating the lever 9 the coupling sleeve 4 is pushed forward, thereby compressing the spring 3. At the same time the mouth-closing piece 5 shifts in forward direction and opens the coupling mouth. The towing eye 6 then slides out of the coupling mouth and thus the trailer is disconnected. As soon as the lever 9 is released, the coupling sleeve 4 springs back with the mouth-closing piece 5 under the pressure exerted by the spring 3 and closes the empty mouth of the coupling.

In the forms of construction illustrated in Figs. 2 to 6, a sheet metal guide piece is used which has the shape of a funnel and is composed of a stationary guide part 27 and a movable guide part 28. According to requirements it is possible to arrange the stationary guide part above (Fig. 2) or below (Fig. 5) the stationary tow hook. In addition, the trailer coupling is in these forms of construction provided with two automatically operating locking devices.

Figure 5:
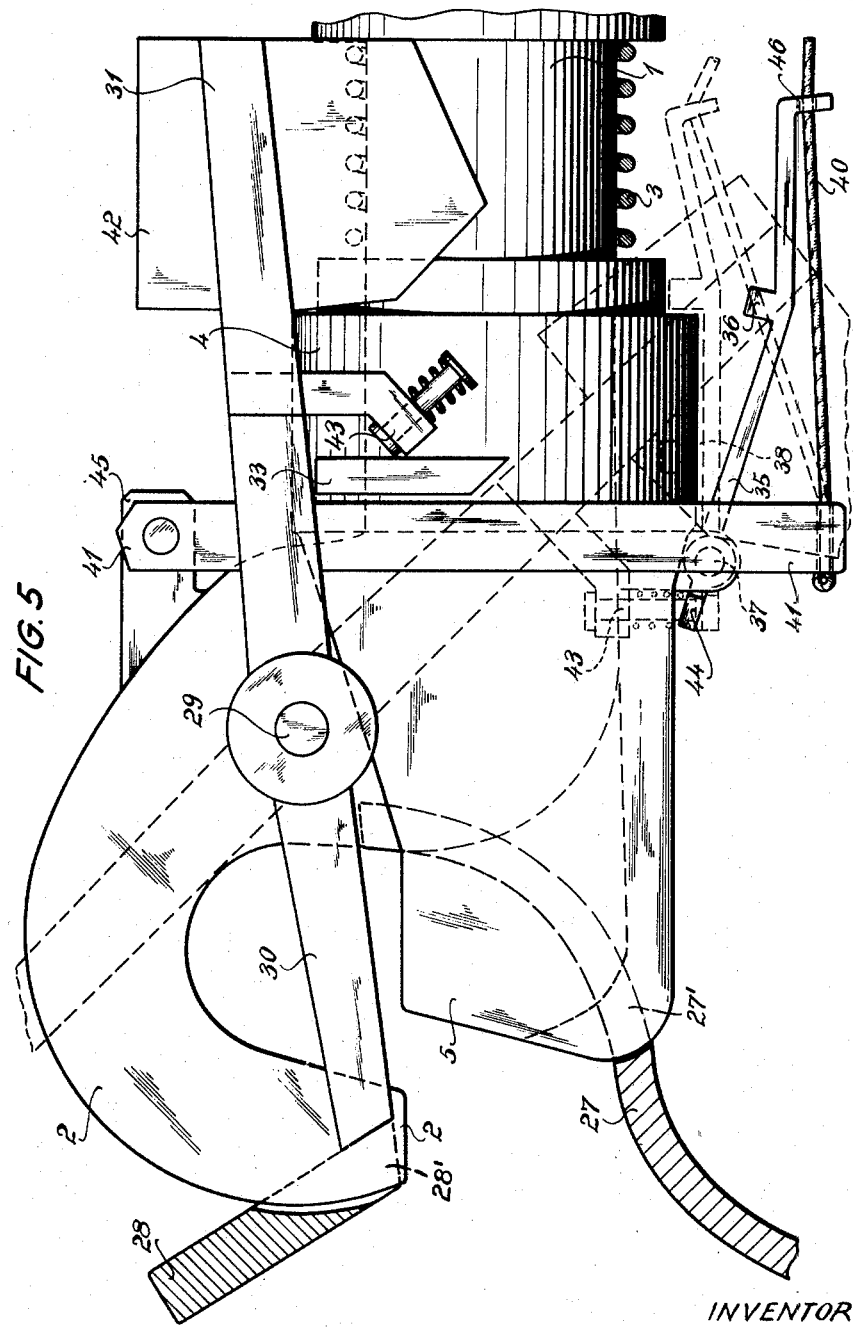
Fig. 5 shows in side elevation, partly in section, a third form of construction with a funnel-shaped sheet metal guide piece composed of a movable upper part and a stationary lower part.

When the stationary guide part 27 of the sheet metal guide piece is arranged below the stationary tow hook 2 as shown in Fig. 5, the coupling can be disengaged by remote control, for example from the driver's seat.

For operating the movable guide part 28 of the sheet metal guide piece a two-armed lever 30, 31 is arranged on each side of the tow hook 2 and pivotally mounted on a bolt 29. The arm 30 of each of said levers is rigidly connected with the movable guide part 28 of the sheet metal guide piece, whereas the other arm 31 of each lever is operatively connected with the coupling sleeve 4.

In the forms of construction, shown in Figs. 2 to 6, the stationary coupling part extends with its tow hook 2 through a cutout 28' in the movable guide part 28 of the sheet metal guide piece and the slidable mouth-closing piece 5 extends through a cutout 27' in the stationary guide part 27 of the sheet metal guide piece.

Other features of the invention concern the second means for locking the trailer coupling in closed position, as will be hereinafter described in detail.

Figure 2:
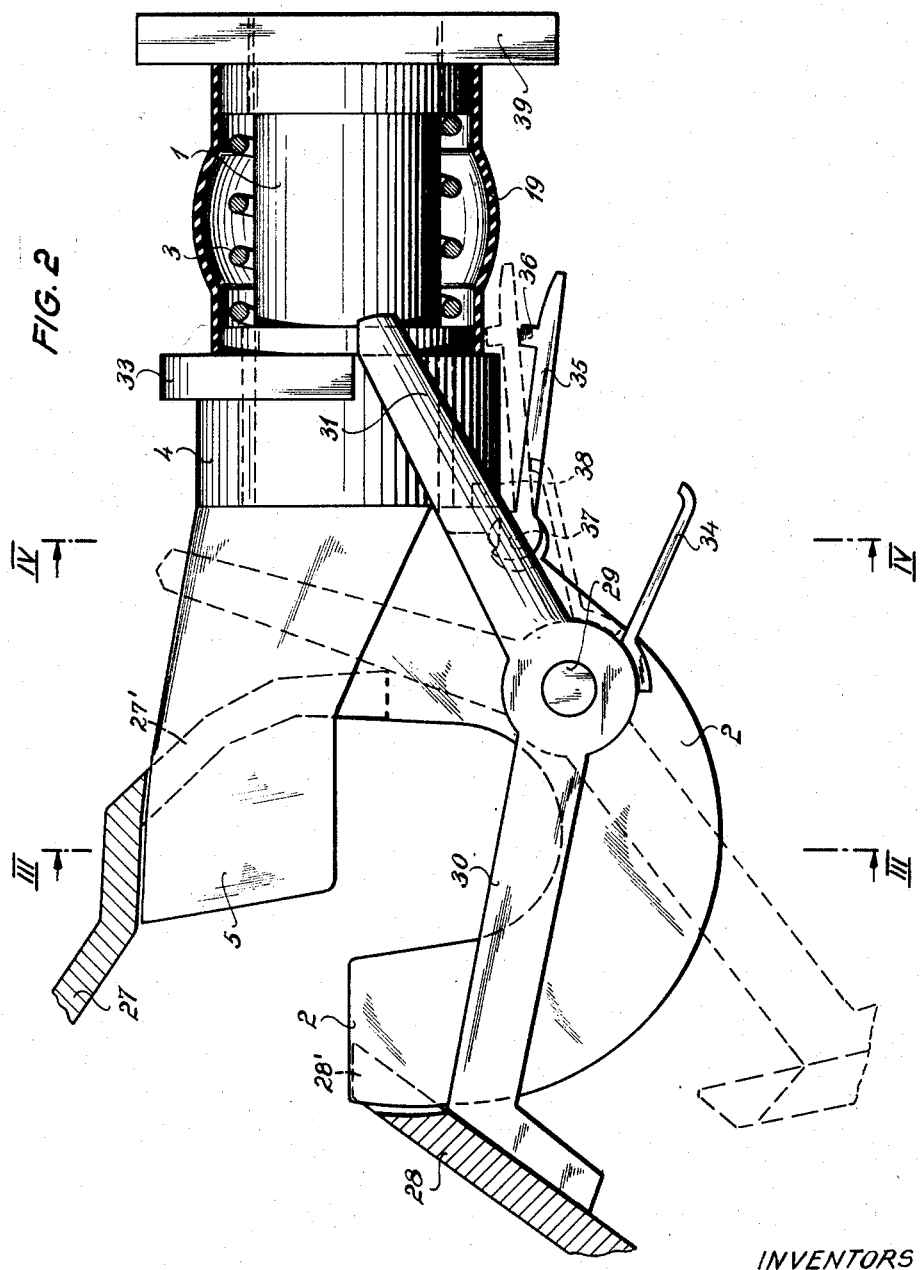
Fig. 2 is a side elevation, partly in section, showing a second form of construction with a funnel-shaped sheet metal guide piece composed of a lower part and an upper part, the lower part being capable of moving in vertical direction whereas the upper part is stationary.
Figure 3:
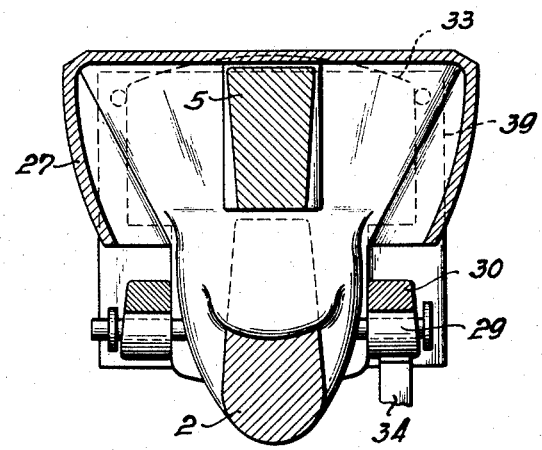
Fig. 3 is a cross section on line III—III of Fig. 2.
Figure 4:
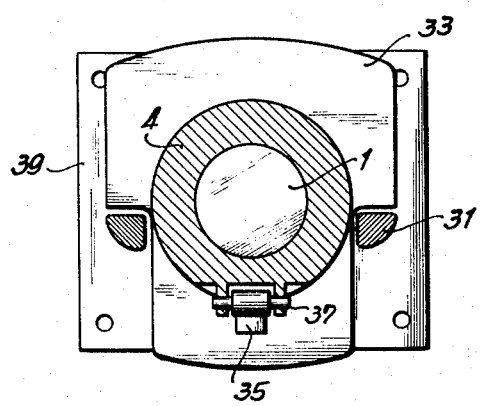
Fig. 4 is a cross section on line IV—IV of Fig. 2.
Figure 6:
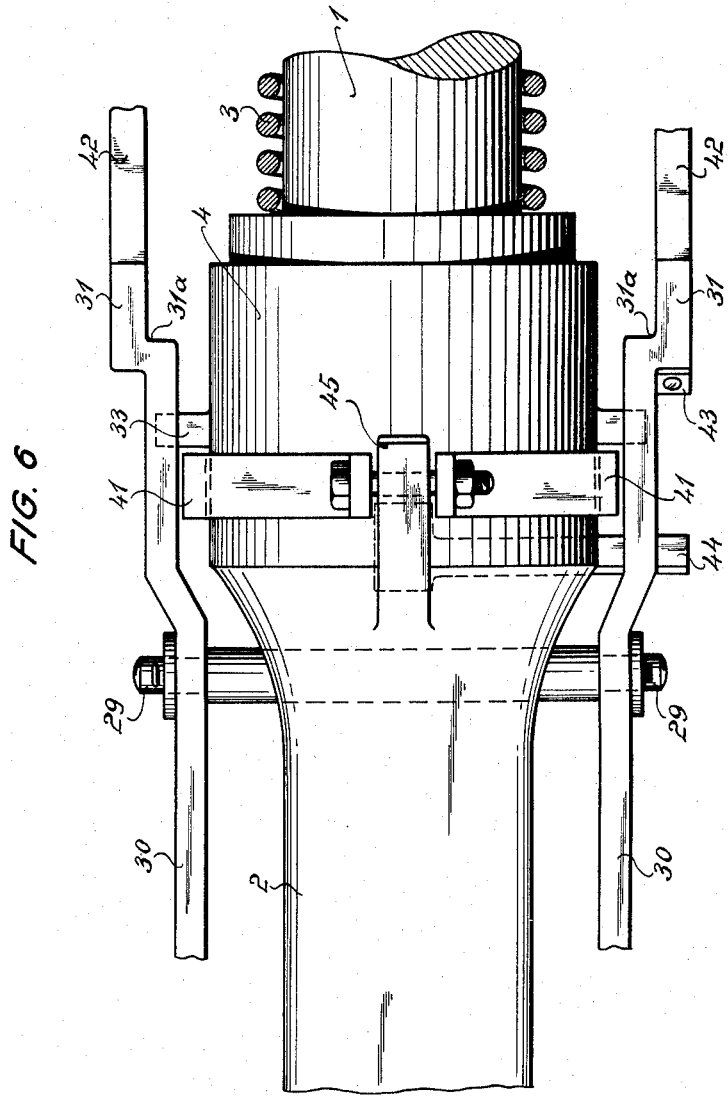
Fig. 6 is a fractional top plan view of the form of construction shown in Fig. 5.

The pivot bolt 29 for the two two-armed levers 30, 31 extending on both sides of the tow hook 2 is mounted in the stationary coupling part (Figs. 2, 5, 6).

While the arm 30 of each lever is rigidly connected with the movable guide part 28, the other arm 31 bears against a projection 33 formed on the coupling sleeve 4 when the funnel is in closed position (Figs. 2 and 5).

In the form of construction illustrated in Fig. 2 a pressure member 34 is fixed on the middle portion of the two-armed levers 30, 31 and, when the movable guide part 28 of the funnel-shaped guide means is swung down, this member 34 pushes upwards a locking lever 35 carrying a pin 36 and serving for the second means of locking, thereby locking the coupling sleeve 4. The locking lever 35 has a pivot bolt 37 mounted on the stationary coupling part.

The coupling sleeve 4 is provided with a recess 38 in which the pin 36 of the locking lever 35 engages when the coupling sleeve 4 with its mouth-closing piece 5, shifted during the disengaging operation, is to be locked in its forward position in order to enable the removal of the towing eye from the tow hook 2 by hand.

The coupling sleeve 4 is loaded by the pressure spring 3 which is arranged on the shank portion 1 of the stationary coupling part between the coupling sleeve 4 and a flange 39. The flange 39 serves for fixing the trailer coupling on a towing vehicle. Also here a rubber sleeve 19 is provided for protecting the pressure spring 3 and the shank portion 1 against fouling and icing.

In the form of construction of the trailer coupling illustrated in Fig. 5 the sheet metal guide piece is composed of an upper movable guide part 28 and a lower stationary guide part 27. The mouth-closing piece 5, the stationary tow hook 2 and the two-armed levers 30, 31 oscillatably mounted on the two sides of the stationary coupling part are arranged accordingly.

The free ends of the lever arms 31, which in this case have a bend 31a (Fig. 6), carry a weight 42. When the sheet metal guide piece is closed, the lever arms 31 rest on the projection 33 of the coupling sleeve 4. When, in the coupling operation, the mouth-closing piece 5 and consequently the coupling sleeve 4 are shifted by the thrust exerted by the towing eye, the projection 33 on the coupling sleeve 4 enters the bend 31a (Fig. 6) and deprives the lever arms 31 of their support so that they swing downwardly under the action of the weight 42. The movable guide part 28 of the sheet metal guide piece is raised by this swinging movement so that the tow hook 2 is freed and the towing eye can engage in the tow hook 2. Thereupon the coupling sleeve 4 with the mouth-closing piece 5 springs back into its initial position. Now, a short projection 44 on the locking lever 35 is subjected to the pressure of a spring loaded pressure member 43 and forces the pin 36 of the locking lever 35 behind the coupling sleeve 4 to lock the same.

To enable a trailer to be unhitched when the vehicles are stationary, it must be possible to lock the coupling sleeve 4 with its mouth-closing piece 5 in retracted position. For this purpose the locking lever 35 is depressed by hand out of its locking position shown in dash lines in Fig. 5, and the coupling sleeve 4 with the mouth-closing piece 5 is then pulled back until the locking lever 35 engages by means of its pin 36 the recess 38 in the coupling sleeve 4. When the towing vehicle moves on, the towing eye of the trailer slides out of the coupling mouth.

When coupling a trailer to a towing vehicle by means of trailer couplings constructed as shown in Figs. 2 to 6, the towing eye of the trailer strikes against the mouth-closing piece 5 and shifts the coupling sleeve 4 against the action of the spring 3 in forward direction towards the towing vehicle. The lever arms 31 of the two-armed levers 30, 31 thereby lose their support on the projection 33 of the coupling sleeve 4 so that the movable guide part 28 of the sheet metal guide piece moves downwardly or upwardly, respectively, and thereby releases the tow hook 2. The towing eye can then slide over the tow hook, whereupon the coupling mouth is closed by the mouth-closing piece 5.

To effect disengagement, the locking lever 35 is pressed down by hand out of its locking position shown in dash lines in Figs. 2 and 5. The coupling sleeve 4 is then pushed back by hand until the pin 36 of the locking lever 35 engages in the recess 38 of the coupling sleeve 4. As the mouth-closing piece 5 is now held in open position, the towing eye can be removed by hand (Fig. 2) or drops out automatically (Fig. 5). In order to return the coupling into a state necessary for automatic coupling, the movable guide part 28 of the funnel-shaped guide piece is, after the locking lever 35 has been disengaged from the recess 38, swung upwardly or downwardly, when the lever arm 31 comes to bear against the projection 33 of the coupling sleeve 4.

If it is desired to unhitch the trailer by remote control from the driver's seat while the vehicles are in motion, the driver pulls a cable or rope 40 which is threaded through an eye 46 in the locking lever 35 (Fig. 5), thereby disengaging the pin 36 from the coupling sleeve 4. The stretched and thus straightened pull rope 40 then actuates an operating lever 41 which is pivotally mounted on a holding arm 45 of the stationary coupling part so that the coupling sleeve 4 with the mouth-closing piece 5 is shifted in the direction of pull and exposes the coupling mouth. The towing eye now slides under the action of gravity on the inner slope on the tow hook 2 out of the coupling mouth. As soon as the driver releases the pull rope 40, the coupling sleeve 4 with the mouth-closing piece 5 springs back under the pressure of the spring 3, so that the coupling mouth is again ready for automatic coupling, when the movable part 28 of the sheet metal guide piece has been previously brought back into its initial position by hand.

From the above detailed description of the invention, it is believed that the construction will at once be apparent, and while there are herein shown and described preferred embodiments of the invention, it is nevertheless to be understood that minor changes may be made therein without departing from the spirit and scope of the invention as claimed.

We claim:

1. In an automatically engageable trailer coupling rigidly mounted on the rear cross member of a towing vehicle and including a stationary coupling hook adapted to engage in an annular towing eye of the vehicle to be towed and adapted to be closed by a movable mouth-closing piece, the combination of a shank element one end of which is mounted on the cross member of the vehicle, the other end of said shank element being formed into said stationary coupling hook, guide means on said shank element disposed adjacent said hook for guiding the eye element of the vehicle being towed about the said hook, said guide means also being provided with a cutout portion, a coupling sleeve surrounding the shank element and slidable thereon, said coupling sleeve having one end disposed adjacent the said hook, spring means for normally urging the coupling sleeve toward said hook, said end of the sleeve comprising a hook encompassing and mouth-closing piece slidably disposed in the cutout portion of said guide means, said mouth-closing piece also being slidable to close the mouth of the hook on said shank element when the eye element of the vehicle being towed has been engaged by the said hook.

2. A trailer coupling as set forth in claim 1, wherein the guide means for guiding the towing eye of the trailer is a stationary dish-like sheet metal guide piece with lateral guide walls.

3. A trailer coupling as set forth in claim 1, wherein for remote and hand operation of the coupling sleeve a bracket is provided on a stationary coupling part disposed on the said rear cross member, said bracket carrying a pivotally mounted forked lever provided with slots for engaging pins projecting from each side of the coupling sleeve.

4. A trailer coupling, comprising a stationary coupling part including a tow hook and a shank portion, a mouth-closing piece movable parallel to the longitudinal axis of the stationary coupling part, a coupling sleeve slidable on the shank portion and formed integral with the mouth-closing piece, guide means secured to the trailer coupling for guiding a towing eye of a trailer into engagement with the tow hook of the stationary coupling part, and a cutout in said guide means through which said mouth-closing piece projects, said guide means being of funnel shape and composed of a stationary guide part and a movable guide part substantially vertically movable in relation to the stationary coupling part to expose the tow hook thereof.

5. A trailer coupling as set forth in claim 4, wherein a two-armed lever is pivotally mounted on each side of the stationary coupling part for actuating the movable guide part of the funnel-shaped guide means, one arm of said levers being rigidly connected with the movable guide part of the guide means and the other arm operatively connected with the coupling sleeve.

6. A trailer coupling as set forth in claim 4, wherein a cutout is provided in the movable guide part of the guide means, said cutout forming a passage for the tow hook of the stationary coupling part during the coupling operation.

7. In a trailer coupling as set forth in claim 4, a two-armed lever pivotally mounted on each side of the stationary coupling part for actuating the movable guide part of the funnel-shaped guide means, one arm of said levers being rigidly connected with the movable guide part of the guide means and the other arm operatively connected with the coupling sleeve, and a pressure member fixed at each two-armed lever and cooperating with a locking lever pivotally mounted on the stationary coupling part and constituting a second locking means adapted to lock the coupling sleeve.

8. In a trailer coupling as set forth in claim 4, a two-armed lever pivotally mounted on each side of the stationary coupling part for actuating the movable guide part of the funnel-shaped guide means, one arm of said levers being rigidly connected with the movable guide part of the guide means and the other arm operatively connected with the coupling sleeve, and a weight arranged on the arms operatively connected with the coupling sleeve, said arms having lateral bends into which projections on the coupling sleeve enter to remove the support of the arms when the coupling sleeve is displaced.

9. In a trailer coupling as set forth in claim 4, a two-armed lever pivotally mounted on each side of the stationary coupling part for actuating the movable guide part of the funnel-shaped guide means, one arm of said levers being rigidly connected with the movable guide part of the guide means and the other arm operatively connected with the coupling sleeve, and a pressure member resiliently mounted on one of the arms of the two-armed levers, and adapted to cooperate with a short projection on a locking lever pivotally mounted on the stationary coupling part and serving as second locking means, said locking lever having a pin adapted to lock the coupling sleeve.

10. A trailer coupling as set forth in claim 4, wherein the movable guide part of the guide means cooperates with a locking lever pivotally mounted on the stationary coupling part and adapted to lock the coupling sleeve, said locking lever having at its free end a guide eye for a pull-rope connected with one of its ends to an operating lever for the coupling sleeve.

11. A trailer coupling as set forth in claim 4, wherein the coupling sleeve is provided with a recess adapted to be engaged by a pin on a locking lever for holding the mouth-closing piece in retracted position during disengagement of the coupling.

References Cited in the file of this patent

UNITED STATES PATENTS

| | | |
|---|---|---|
| 1,304,695 | Menhall | May 27, 1919 |
| 1,458,086 | Thiel | June 5, 1923 |
| 2,194,866 | Morrow | Mar. 26, 1940 |
| 2,711,679 | Kuhary et al. | June 28, 1955 |

FOREIGN PATENTS

| | | |
|---|---|---|
| 673,550 | France | Oct. 8, 1929 |
| 727,093 | France | June 13, 1932 |